United States Patent Office 2,985,653
Patented May 23, 1961

2,985,653

NEW PIPERAZINYL-ALKYL-PHENTHIAZINES AND THEIR PREPARATION

Robert Michel Jacob, Ablon-sur-Seine, and Jacques Georges Robert, Gentilly, France, assignors to Societe des Usines Chimiques Rhone-Poulenc, Paris, France, a French body corporate No Drawing. Filed June 3, 1959, Ser. No. 817,713

Claims priority, application France June 10, 1958

5 Claims. (Cl. 260—243)

This invention relates to new derivatives of phenthiazine, to processes of their preparation, and pharmaceutical compositions containing them.

During especially the past decade, considerable research and experimentation have been conducted in the field of N-substituted phenthiazine derivatives and certain of these compounds have been found to possess valuable therapeutic properties. Some are useful primarily on account of outstanding antihistaminic activity, others because of their unusually powerful effect as potentiators of drugs which act upon the nervous system and of their efficacy as anti-shock agents and yet others, for example, are effective agents for controlling or minimising motion-sickness. It has nevertheless been demonstrated that of the very large number of possible N-substituted phenthiazine compounds that have been proposed or tested by various workers, only comparatively few types have useful application in human or veterinary medicine and that both the nature and the degree of useful effect can radically alter even with apparently small changes in chemical structure.

It is an object of the present invention to provide new phenthiazine derivatives which possess unexpectedly useful pharmacological properties of a nature hereinafter referred to in detail and of a degree of activity that could not have been predicted from knowledge of their chemical structure.

The phenthiazine derivatives of the present invention are those which conform to the general formula:

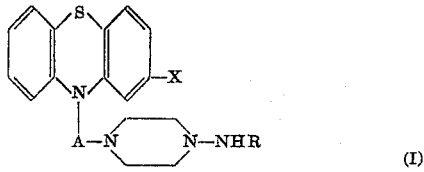

(I)

and their acid addition and quaternary ammonium salts, wherein X represents a hydrogen or halogen atom or a lower alkyl, alkoxy, acyl or alkoxycarbonyl group or a cyano, methylthio, methanesulphonyl, dimethylsulphamoyl or trifluoromethyl group, A represents a divalent straight or branched aliphatic hydrocarbon group containing 2 to 4 carbon atoms with at least two carbon atoms between the nitrogen atom of the phenthiazine nucleus and that of the piperazine nucleus, and R represents a lower acyl, alkoxycarbonyl or alkanesulphonyl group, or a carbamoyl or sulphamoyl group which may be substituted on the nitrogen atom to form, for example, a group conforming to the formula

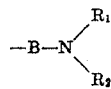

wherein B represents a CO or $SO_2$ group, and $R_1$ represents a hydrogen atom or a lower alkyl group and $R_2$ represents a lower alkyl group or $R_1$ and $R_2$ together with the nitrogen atom to which they are attached form a pyrrolidino, piperidino or morpholino group. The word "lower" as herein applied to alkyl, alkoxy, acyl and alkane groups means that the group in question contains not more than four carbon atoms. The hydrocarbon group A may be, for example, any of the following groups:

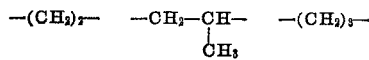

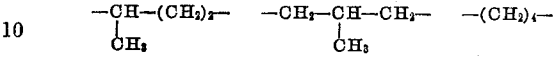

These new phenthiazine compounds may be prepared by the application of known methods for the conversion of phenthiazine and its C-substituted products into the corresponding 10-aminoalkyl-phenthiazines. Such methods when so applied can be defined generically as comprising the interaction of a phenthiazine derivative of the formula:

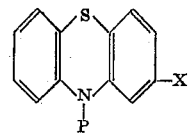

(II)

(wherein X is as hereinbefore defined) with a compound Q, the group P and the compound Q being such that they will interact to produce or form in the 10-position of the phenthiazine nucleus a grouping of the formula:

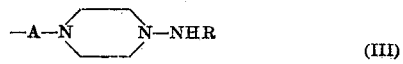

(III)

(wherein A and R are as hereinbefore defined).

According to a feature of the present invention, the phenthiazine derivatives of general Formula I are prepared by a process which comprises reacting a phenthiazine of the general formula:

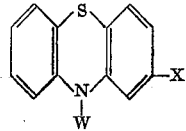

(IV)

with a piperazine derivative of the general formula:

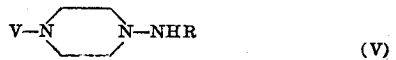

(V)

wherein one of the groups W and V represents a hydrogen atom and the other a group —A—Y, Y representing the acid residue of a reactive ester, such as a halogen atom or a sulphuric or sulphonic ester residue, and the other symbols are as hereinbefore defined. Where X is an acyl group, it may be advantageous to protect this group during the reaction, for example, by forming an anil or ketal.

The reaction may be effected with or without a solvent in the presence or absence of a condensing agent.

When W represents a hydrogen atom and V represents the group —A—Y, it is advantageous to use a solvent of the group of aromatic hydrocarbons (for example, toluene or xylene), ethers (for example, diethyl ether) or tertiary amides (for example, dimethylformamide) in the presence of a condensing agent preferably of the class of alkali metals and their derivatives (such as, for example, hydrides, amides, hydroxides, alcoholates, metal alkyls or aryls) and, more particularly, metallic sodium or potassium, sodamide, powdered sodium or potassium hydroxide, lithium or sodium hydride, sodium tert-butoxide, butyllithium, phenyllithium or phenylsodium. The reaction is preferably carried out at the boiling temperature of the solvent. It is particularly advantageous to use a piperazinylalkyl halide in the form of the free base in solution in, for example, benzene, toluene or xylene and to add it to the mixture of other reagents wherein the phenthiazine employed may already be present, in part at least, in the form of an alkali metal salt. The reaction may also be effected with a salt of the piperazinylalkyl halide but in this case a greater proportion of the condensing agent must be used in order to neutralise the acid of the salt employed.

In the case where the divalent aliphatic hydrocarbon group —A— is an asymmetric branched chain, such for example as

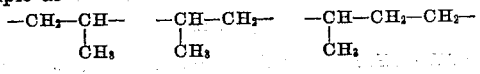

or

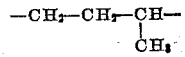

isomerisation can take place during the course of the reaction with the formation of a mixture of isomers. This isomerisation is analogous to that which takes place in the preparation of promethazine by the condensation of phenthiazine with a dimethylaminohalogenopropane, a process which, using either 2-dimethylamino-1-chloropropane or 1-dimethylamino-2-chloropropane as starting material, gives the same final mixture in which promethazine predominates. Separation of the isomers may be effected by, for example, fractional crystallisation of salts such as the hydrochlorides from a suitable solvent such as an alcohol.

When V represents a hydrogen atom and W represents the group —A—Y, it is advantageous to carry out the reaction in an aromatic hydrocarbon or an alcohol solvent medium and to use as condensing agent an excess of the piperazine derivative.

According to a further feature of the present invention, the new phenthiazine derivatives of Formula I are prepared by the process which comprises converting the —NH$_2$ grouping in a piperazinylalkylphenthiazine of the general formula:

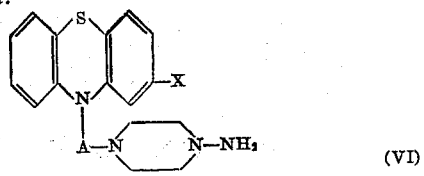

(VI)

into the grouping —NHR (wherein R and the other symbols are as hereinbefore defined) by known methods for the introduction of an acyl, alkoxycarbonyl, alkanesulphonyl, carbamoyl or sulphamoyl group into a primary amino group. By the words "known methods" as used in this specification and the appended claims is meant methods heretofore employed or described in the chemical literature.

The conversion may be effected, for example, by reacting the phenthiazine derivative with a carboxylic acid anhydride, chloride or ester (products of Formule I are obtained in which R is an acyl group), an alkyl chlorocarbonate (products of Formula I are obtained in which R is an alkoxycarbonyl group), an alkanesulphonyl halide (products of Formula I are obtained in which R is an alkanesulphonyl group), a carbamoyl halide, alkali metal isocyanate or alkylisocyanate (products of Formula I are obtained in which R is a carbamoyl group), or a sulphamoyl halide (products of Formula I are obtained in which R is a sulphamoyl group).

The piperazinylalkylphenthiazines of Formula VI may be obtained by reduction, for example with zinc and acetic acid or with lithium aluminium hydride, of a nitrosopiperazinylalkylphenthiazine of the general formula:

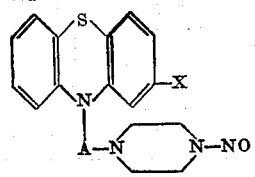

(VII)

obtained by the nitrosation by means of an alkali metal salt of nitrous acid in an acid medium of a phenthiazine of the general formula:

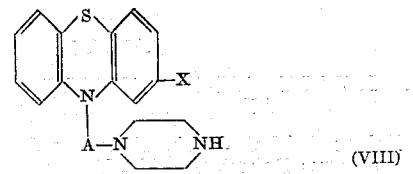

(VIII)

(wherein A and X are as hereinbefore defined).

The new phenthiazine derivatives of Formula I may be converted in manner known per se into acid addition salts and quaternary ammonium derivatives. The acid addition salts may be obtained by the action of acids on the phenthiazine derivatives in appropriate solvents. As organic solvents there may be used, for example, alcohols, ethers, ketones or chlorinated hydrocarbons; water may advantageously be used as an inorganic solvent. The salt which is formed is precipitated, if necessary after concentration of its solution, and is separated by filtration or decantation.

The quaternary ammonium derivatives may be obtained by the action of esters on the phenthiazine derivatives, optionally in an organic solvent, at room temperature, or, more rapidly, with gentle heating.

The new phenthiazine derivatives of Formula I may be purified by physical methods such as distillation, crystallisation or chromatography, or by chemical methods such as the formation of salts, crystallisation of the salts and decomposition of them in an alkaline medium. In the said chemical method the nature of the anion of the salt is immaterial, the only requirement being that the salt must be well-defined and readily crystallisable.

The new phenthiazine derivatives of the present invention possess valuable pharmacodynamic properties; in particular, they are extremely active depressors of the nervous system, excellent potentiators of narcosis, tranquillisers, powerful antiemetics and analgesics. Compounds of the present invention which possess outstanding utility in the aforesaid respects are those in which the hydrocarbon chain A is

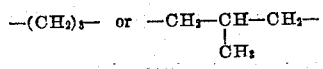

individual compounds of importance are 3-chloro-10-(3-4'-carbamoylamino-1'-piperazinylpropyl)phenthiazine, 3-chloro-10-(3-4'-methylsulphamoyl-1-piperazinylpropyl)phenthiazine, 3-methoxy-10-(3-4'-acetylamino-1'-piperazinyl-2-methylpropyl)phenthiazine, and 3-methoxy-10-(3-4'-acetylamino-1'-piperazinylpropyl)-phenthiazine.

For therapeutic purposes, the bases of general Formula I are preferably employed as such or in the form of non-toxic acid addition salts, i.e. salts containing anions which are relatively innocuous to the animal organism in therapeutic doses of the salts (such as hydrochlorides and other hydrohalides, phosphates, nitrates, sulphates, acetates, propionates, succinates, benzoates, fumarates, maleates, oxalates, tartrates, methanesulphonates, ethanedisulphonates, chlorotheophyllinates, theophylline-acetates, salicylates, phenolphthaleinates, and methylene-bis-β-hydroxynaphthoates) so that the beneficial physiological properties inherent in the bases are not vitiated by side-effects ascribable to the anions. However, they may also be employed in the form of non-toxic quaternary ammonium salts obtained by reaction with organic halides (e.g. methyl, ethyl, allyl or benzyl chloride, bromide or iodide) or other reactive esters, e.g. methyl or ethyl sulphate or toluene-p-sulphonate.

The following examples illustrate the invention.

*Example 1*

To a solution of 3-chloro-10-(3-4'-amino-1'-piperazinylpropyl)-phenthiazine (9.2 g.) in N hydrochloric acid (78 cc.) is added over 20 minutes a solution of potassium cyanate (2.4 g.) in water (20 cc.), the temperature being maintained at about 20° C. Agitation is then continued for 15 hours at the same temperature. After making the reaction mixture alkaline by the addition of 4 N sodium hydroxide (20 cc.), the free base is extracted with ethyl acetate. The organic solution is dried over anhydrous potassium carbonate and concentrated to a small volume at atmospheric pressure. After cooling, the base which has crystallised is filtered off, washed with ethyl acetate and dried at 80° C. under a pressure of 1 mm. Hg. There is thus obtained 3-chloro-10-(3-4'-carbamoylamino - 1' - piperazinylpropyl)phenthiazine (4.1 g.) as a white crystalline powder, M.P. 188–189° C.

3-chloro-10-(3-4'-amino - 1' - piperazinylpropyl)phenthiazine employed as starting material is a thick oil (used in crude form) obtained by the reduction of 3-chloro-10-(3-4'-nitroso - 1' - piperazinylpropyl)phenthiazine with lithium aluminium hydride in anhydrous ether. The aforesaid nitroso derivative (the acid oxalate of which melts at 187–188° C.) is prepared by the action of sodium nitrite upon an aqueous solution of 3-chloro-10-(3-1'-piperazinylpropyl)phenthiazine dihydrochloride.

*Example II*

To a solution of 3-chloro-10-(3-4'-amino-1'-piperazinylpropyl)phenthiazine (32.2 g.) in chloroform (360 cc.) are added successively anhydrous pyridine (6.8 g.) and methanesulphonyl chloride (9.85 g.) and the mixture is heated for 2½ hours under reflux. After cooling, the reaction mixture is washed with 0.5 N sodium hydroxide (240 cc.), and the chloroform phase is dried over anhydrous potassium carbonate and concentrated to dryness on the water-bath under a pressure of about 20 mm. Hg.

The oily residue is redissolved in benzene (1 litre) and the solution is filtered through a column of chromatographic alumina (600 g.). After successive elution with benzene, mixtures of benzene and ethyl acetate of increasing ester concentration and finally with pure ethyl acetate and evaporation of the solvent there is obtained pure 3-chloro-10-(3-4'-methylsulphamoyl-1'-piperazinylpropyl)phenthiazine (16.6 g.) which, after recrystallisation from ethyl acetate, is obtained as a creamy white crystalline powder, M.P. 169° C.

*Example III*

A solution of 3-methoxy-10-(3-chloro-2-methylpropyl)-phenthiazine (54.5 g.) and 1-acetylaminopiperazine (24.3 g.) in anhydrous ethanol (360 cc.) is heated with powdered anhydrous sodium carbonate (18 g.) for 15 hours under reflux. Further carbonate (9 g.) is added and heating is continued for 9 hours. After a final addition of carbonate (9 g.), the reaction is completed by heating for a further 15 hours under reflux.

The ethanol is removed under reduced pressure (about 29 mm. Hg), the residue is treated with water (250 cc.) and ethyl acetate (200 cc.) and the organic phase is separated and dried over anhydrous potassium carbonate.

On the addition of an excess of ethereal hydrogen chloride to the organic solution, the hydrochloride of the condensation product separates and is filtered off and washed with ether. The salt is redissolved in water, the solution is made alkaline with sodium hydroxide (d.=1.33), the free base is extracted with ethyl acetate (3 x 300 cc.) and the organic solution is dried over anhydrous potassium carbonate and concentrated to dryness under reduced pressure (about 20 mm. Hg).

The crude crystalline base thus obtained (18.1 g.) is finally recrystallised from acetonitrile and there is thus obtained 3-methoxy - 10-(3-4'-acetylamino-1'-piperazinyl-2-methylpropyl)phenthiazine (15.4 g.) as a creamy white crystalline powder, M.P. 177–178° C.

The 3-methoxy - 10-(3-chloro-2-methylpropyl)phenthiazine employed as starting material is obtained by the condensation of 1-chloro-2-methyl-3-bromopropane with 3-methoxyphenthiazine in liquid ammonia in the presence of sodamide and is used in the crude form.

The 1-acetylaminopiperazine (M.P. 146° C.) is obtained by catalytic debenzylation with palladised charcoal in methanol of 1-benzyl-4-acetylaminopiperazine (M.P. 136° C.) itself obtained by the acetylation of 1-benzyl-4-aminopiperazine. The required 1-benzyl-4-aminopiperazine (B.P. 126–130° C./1.2 mm. Hg) is prepared by the reduction with zinc and acetic acid of 1-benzyl-4-nitrosopiperazine, the latter (M.P. 55–56° C.: B.P. 144–152° C./0.8 mm. Hg) being itself prepared by the nitrosation of 1-benzylpiperazine in the form of the dihydrochloride in aqueous solution with sodium nitrite.

*Example IV*

3-methoxy - 10-(3-toluene-p-sulphonyloxypropyl)phenthiazine (38 g.) is heated under reflux for 17 hours with 1-acetylaminopiperazine (12.1 g.) and anhydrous sodium carbonate (9 g.) in ethanol (450 cc.). The alcohol is removed under reduced pressure, the residue is treated with water and ethyl acetate. The base is extracted with N hydrochloric acid, liberated by the addition of sodium hydroxide solution and extracted with benzene. On recrystallisation from acetone, there is obtained 3-methoxy-10-(3-4'-acetylamino - 1' - piperazinylpropyl)phenthiazine (25 g.), M.P. 115° C. the hydrochloride of which prepared in ethanol melts at 260° C.

The present invention further includes within its scope pharmaceutical compositions which comprise one or more compounds of general Formula I or their acid addition or quaternary ammonium salts together with a significant amount of a pharmaceutical carrier. The invention includes especially such compositions made up for oral, rectal, or parenteral administration.

Solid compositions for oral administration include compressed tablets, pills, dispersible powders, and granules. In such solid compositions one or more of the active compounds of general Formula I is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention, for oral administration include capsules of absorbable material such as gelatin containing one or more of the active substances of general Formula I with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired in the species of animal shall be obtained. Obviously several unit dosage forms may be administered at about the same time. In general, the preparations should normally contain between 0.1 and 10 mg. per kilogram of weight of the animal to be treated. In human medicine, the preparations of the present invention should be administered so as to give, in the case of oral administration, 20 to 600 mg. of active substance per day and, in the case of parenteral administration, 10 to 500 mg. of such substance per day.

The following examples illustrate pharmaceutical compositions according to the invention.

*Example V*

Tablets (150 mg.) are prepared containing:

| | |
|---|---|
| 3-chloro - 10 - (3-4'-carbamoylamino-1' - piperazinyl propyl)phenthiazine _____ mg. | 25.8 |
| Starch _____ mg. | 91.2 |
| Finely powdered silica _____ mg. | 30 |
| Magnesium stearate _____ mg. | 3 |

*Example VI*

Tablets (150 mg.) are prepared containing:

| | |
|---|---|
| 3-methoxy - 10 - (3-4'-acetylamino-1' - piperazinyl-2-methylpropyl)phenthiazine _____ mg. | 10.6 |
| Starch _____ mg. | 106.4 |
| Powdered silica _____ mg. | 30 |
| Magnesium stearate _____ mg. | 3 |

We claim:
1. A member of the class consisting of phenthiazine derivatives of the formula:

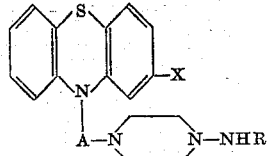

wherein X represents a member of the class consisting of halogen atoms and the methoxy group, A represents a saturated aliphatic hydrocarbon group containing 2 to 4 carbon atoms with at least two carbon atoms between the nitrogen atom of the phenthiazine nucleus and that of the piperazine nucleus, and R represents a member of the class consisting of acetyl, carbamoyl and methyl sulphamoyl groups, and their non-toxic acid addition salts.

2. 3-chloro-10-(3-[4'-carbamoylamino-1'-piperazinyl]-propyl)phenthiazine.

3. 3 - chloro - 10 - (3 - [4'-methylsulphamoyl-1'-piperazinyl]-propyl)phenthiazine.

4. 3 - methoxy-10-(3-[4'-acetylamino-1'-piperazinyl]-2-methylpropyl)phenthiazine.

5. 3 - methoxy - 10-(3-[4'-acetylamino-1'-piperazinyl]-propyl)-phenthiazine.

References Cited in the file of this patent

Derwent: Commonwealth Patents Report, vol. 178, Group 3(A), page 2, published March 11, 1960. [Abstract of Australian Patent 49646/59, issued June 10, 1959, Societe des Usines Chimiques Rhone-Poulenc, 16 pages.]